United States Patent
Newcomb

(10) Patent No.: US 10,175,020 B2
(45) Date of Patent: Jan. 8, 2019

(54) HUNTING ASSEMBLY COMBINATION INCLUDING GUN REST AND GUN BARREL SLEEVE

(71) Applicant: David Newcomb, Santa Fe, NM (US)

(72) Inventor: David Newcomb, Santa Fe, NM (US)

(*) Notice: Subject to any disclaimer, the term of this patent is extended or adjusted under 35 U.S.C. 154(b) by 15 days.

(21) Appl. No.: 15/460,597

(22) Filed: Mar. 16, 2017

(65) Prior Publication Data

US 2017/0276449 A1    Sep. 28, 2017

Related U.S. Application Data

(60) Provisional application No. 62/312,540, filed on Mar. 24, 2016.

(51) Int. Cl.
| | |
|---|---|
| *F41A 29/00* | (2006.01) |
| *F41A 23/02* | (2006.01) |
| *F41A 21/44* | (2006.01) |
| *A01M 31/02* | (2006.01) |

(52) U.S. Cl.
CPC .......... *F41A 23/02* (2013.01); *A01M 31/025* (2013.01); *F41A 21/44* (2013.01)

(58) Field of Classification Search
CPC .......... F41A 23/02; F41A 23/04; F41A 21/44
USPC .............................................................. 42/94
See application file for complete search history.

(56) References Cited

U.S. PATENT DOCUMENTS

| | | | | |
|---|---|---|---|---|
| 2,664,659 A | * | 1/1954 | Parker | F41A 23/00 42/94 |
| 2,706,036 A | * | 4/1955 | Neal | F41C 33/06 206/317 |
| 3,299,558 A | * | 1/1967 | Karl | F41A 21/02 42/124 |
| 3,935,657 A | * | 2/1976 | Wade | F41A 23/00 42/94 |
| 3,947,988 A | | 4/1976 | Besaw | |
| 4,207,699 A | | 6/1980 | Hensley | |
| 5,048,217 A | * | 9/1991 | Easter | F41A 35/02 42/96 |
| 5,050,330 A | | 9/1991 | Pilgrim et al. | |
| 5,233,779 A | | 8/1993 | Shaw | |
| 5,332,185 A | | 7/1994 | Walker, III | |
| 5,778,590 A | * | 7/1998 | Browning | B32B 27/08 42/96 |
| 5,808,227 A | | 9/1998 | Amos | |
| 5,964,435 A | | 10/1999 | Peltier | |
| 6,158,159 A | | 12/2000 | Zekas | |
| 6,256,922 B1 | * | 7/2001 | Jones | F41A 35/02 42/96 |

(Continued)

OTHER PUBLICATIONS

Gun/Barrel Socks Webers Guns, downloaded from web page: https://www.webersguns.com/gunbarrel-socks-c-89_99.html, download date Feb. 10, 2016, 3 pages.

(Continued)

*Primary Examiner* — Gabriel J. Klein
(74) *Attorney, Agent, or Firm* — Rogowski Law LLC

(57) ABSTRACT

A combination of accessories for use in a deer blind includes a gun rest and a gun barrel sleeve. The gun rest is a three dimensional structure such as a lightweight block having different dimensions to allow different height positioning of a gun. The gun barrel sleeve covers at least the portion of the gun barrel. The gun barrel sleeve may be stored in a hollow opening provided in the gun rest.

12 Claims, 2 Drawing Sheets

(56) References Cited

U.S. PATENT DOCUMENTS

| | | | |
|---|---|---|---|
| 6,986,221 B2 | 1/2006 | Mullis | |
| 7,185,607 B1* | 3/2007 | Pearson | F41A 35/02 |
| | | | 42/96 |
| 8,104,212 B2 | 1/2012 | Potterfield et al. | |
| 8,522,470 B2 | 9/2013 | Mangum | |
| 2007/0062090 A1* | 3/2007 | Brindle | F41A 35/02 |
| | | | 42/96 |
| 2010/0170135 A1* | 7/2010 | Tompkins | F41A 35/02 |
| | | | 42/96 |
| 2012/0152095 A1 | 6/2012 | Youngman | |
| 2013/0305585 A1* | 11/2013 | Thibodaux | F41A 23/04 |
| | | | 42/94 |
| 2014/0215889 A1 | 8/2014 | Abdennour et al. | |
| 2015/0082679 A1* | 3/2015 | Michal | F41A 21/24 |
| | | | 42/71.01 |
| 2016/0084603 A1* | 3/2016 | Michal | F41A 23/26 |
| | | | 42/94 |

OTHER PUBLICATIONS

Guns Holsters and Gear honest reviews and news on firearms, downloaded from web page: http://www.gunsholstersandgear.com/2014/01/22/maxbox-gun-rest/ download date Feb. 4, 2016, 5 pages.
Neoprene Single Barrel Cover | Jack Pyke Neoprene Single Barrel Cover, downloaded from web page: http:/www.jackpykeshop.co.uk/neoprene-single-barrel-cover.html, Download date: Feb. 4, 2016, 4 pages.

* cited by examiner

HUNTING ASSEMBLY COMBINATION INCLUDING GUN REST AND GUN BARREL SLEEVE

CROSS-REFERENCE TO RELATED APPLICATION

This application is a regular utility application claiming priority under 35 USC § 119(e) to U.S. Provisional Patent Application Ser. No. 62/312,540, filed Mar. 24, 2016, the contents of which are incorporated by reference herein.

FIELD OF THE INVENTION

The present invention relates to the field of hunting accessories and in particular to a combination of components for use when hunting. The components may form a kit and comprise a gun rest and a gun barrel sleeve. In some embodiments, the gun barrel sleeve may be stored and carried in the gun rest.

BACKGROUND OF THE INVENTION

In many parts of the United States, deer are hunted from a deer blind which conceals the hunter from view. A deer blind structure normally includes surrounding walls (or at least a front wall) and may include an interior seat. In at least one side of the blind, a window is provided, which the hunter may look out. A shelf may be provided below the window on the interior of the blind, on which the hunter may position his arms to support a gun while firing out the window, or upon which items may be placed for easy access by the hunter.

When an opportunity to fire is presented, the hunter points the rifle or shotgun out of the window of the blind, and fires from within the blind. During the positioning of the gun to fire, the barrel can hit the edge of the window. If the blind is wood or metal, the sound may alarm the prey and the opportunity can be lost. Moreover, when the barrel of the rifle or shotgun is pointed out of the blind, it is visible to the prey, which can also alarm a cautious prey and result in loss of the opportunity.

Various gun rests are known in the prior art, including shooting blocks, sand-filled bags, and different types of mechanical gun rests in which the height of a gun resting thereon may be adjusted.

Gun sleeves formed for example from cloth are known in the art for storage and transport of guns. Normally such a sleeve encases the entire gun.

It is desirable to avoid heavy, cumbersome and/or complex accessories when hunting. Items carried to a hunting blind are preferably lightweight, weather-resistant and durable.

SUMMARY OF THE INVENTION

The present invention finds applicability, for example, in the particular setting of a deer blind described above. The elements of the invention, acting together, provide both noise reduction, gun elevation at a variety of heights, and concealment of the portion of a gun (e.g., the barrel) which is exposed when shooting from a blind.

In a first embodiment, the invention comprises a combination of hunting accessories, comprising: a) a lightweight gun rest having three dimensions; and b) a gun barrel sleeve which fits over at least a portion of a gun barrel, preferably over the entire gun barrel.

In a preferred embodiment, the gun rest has three dimensions which are each different from one another. For example, the gun rest may be shaped as a block having a length of five inches, a height of four inches, and a depth of three inches. By positioning the block on a particular edge, the hunter may rest a gun at a desired height between three and five inches above the supporting surface upon which the block is resting (e.g. the shelf below the window of a deer blind).

In a further preferred embodiment, the gun rest is provided with a hollow opening therein, for example in one end of a block-shaped gun rest. The hollow opening is sized so as to carry the gun sleeve, preferably when the gun sleeve is rolled up, for ease of storing and transporting the components together.

In a preferred embodiment, the gun rest is constructed from a lightweight, durable, noise-dampening material, such as plastic, foam or rubber. The gun rest is preferably colored on the exterior with a dull, non-reflective color and/or a camouflage pattern.

In a further preferred embodiment, the barrel sleeve is sized to cover at least the portion of a gun barrel which extends outside of the window of a blind during normal firing. Preferably, the gun barrel sleeve is sized to cover the entire gun barrel, but may also cover part of the gun stock and/or part of an attached scope. The barrel sleeve is constructed from a lightweight, weather-resistant material such as cloth or mesh and is also preferably drab and/or camouflage color.

In a further embodiment, the invention comprises an accessory kit for hunting, comprising: a) a gun rest having a length dimension, a height dimension, and a width dimension, and having a hollow opening therein; and b) a gun barrel sleeve which covers at least a portion of the barrel of a gun, and preferably the entire barrel of a gun; wherein the hollow opening in the gun rest can hold the gun barrel sleeve therein for carrying and storage.

In a further embodiment, the invention comprises a combination of accessories for hunting or shooting, comprising: a) a gun rest; and b) a gun sleeve; wherein the gun sleeve can be stored in the gun rest. The gun sleeve preferably covers at least the entire barrel of a gun.

Both the gun rest and the gun barrel sleeve are preferably fashioned from materials that are lightweight yet rugged, to withstand field conditions and hard usage.

DESCRIPTION OF PREFERRED EMBODIMENTS

Figure 1:
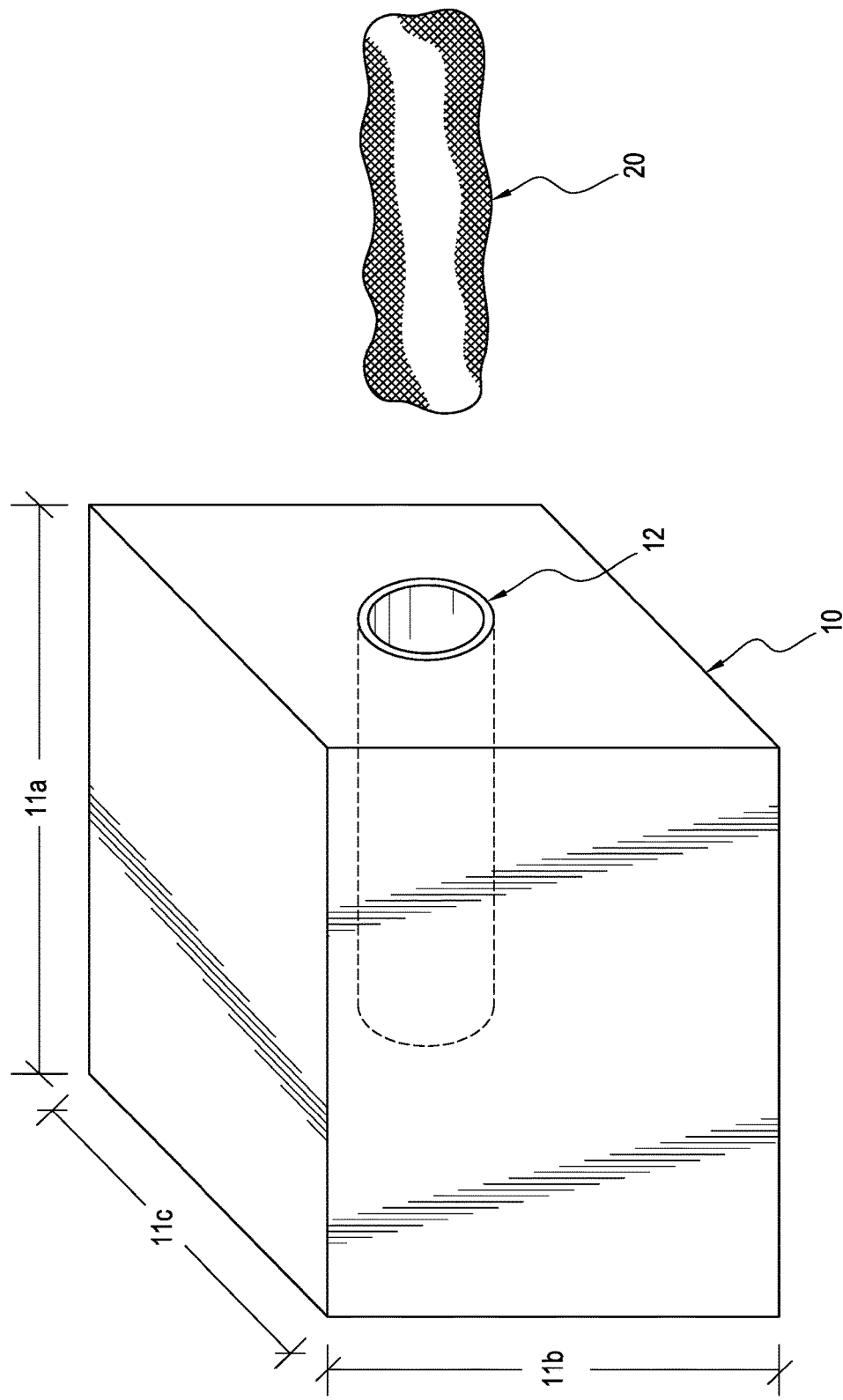
FIG. 1 is a perspective view of an embodiment of the invention showing a block-shaped gun rest having length, height and width dimensions, and having a hollow opening provided therein to receive the gun barrel sleeve. Also shown is a gun sleeve, in rolled-up form.

Referring to FIG. 1, an embodiment of the gun rest 10 is shown together with a gun barrel sleeve 20, which comprise the combination of accessories of the invention. The illustrated embodiment of the gun rest is in the form of a block having length dimension 11a, height dimension 11b, and width dimension 11c. In a preferred embodiment that is particularly suited to use in a common type of deer blind having a support/storage shelf below the window, the three dimensions 11a, 11b and 11c are five inches, four inches and three inches, respectively.

The gun rest component may be formed from any lightweight yet relatively durable material. The gun rest will potentially be exposed to harsh weather conditions and rough handling, which it should endure without breaking or cracking. In addition, the gun rest should be noise-dampening so that minimal sound is produced when the block is placed on a metal or wood shelf, or when a gun barrel is placed on the gun rest. Suitable materials for the gun rest include plastic, polymer or rubber, preferably a durable, partially resilient foam. Exemplary materials include polyethylene, polypropylene, polystyrene, polyurethane, or ethylene vinyl acetate. The gun rest might also be composed of lightweight wood, preferably with a rubber, plastic or foam coating to further dampen noise during its use.

In a preferred embodiment, the gun rest 10 includes a hollow opening 12. As shown, the hollow opening may open to one edge of the gun rest, for example on one end of the block. The hollow opening may extend into the gun rest as shown in phantom lines, and is sized so as to receive the gun barrel sleeve, preferably when the sleeve is rolled up, as shown at 20. In this embodiment, for transport or storage of the components as a kit, the gun sleeve is rolled up and inserted into the gun rest. Optionally, the hollow opening may be lined with a hard plastic cylinder (not shown) to hold the gun sleeve, or may be covered with a plug or cap (not shown) to hold the gun sleeve in the gun rest.

Figure 2:
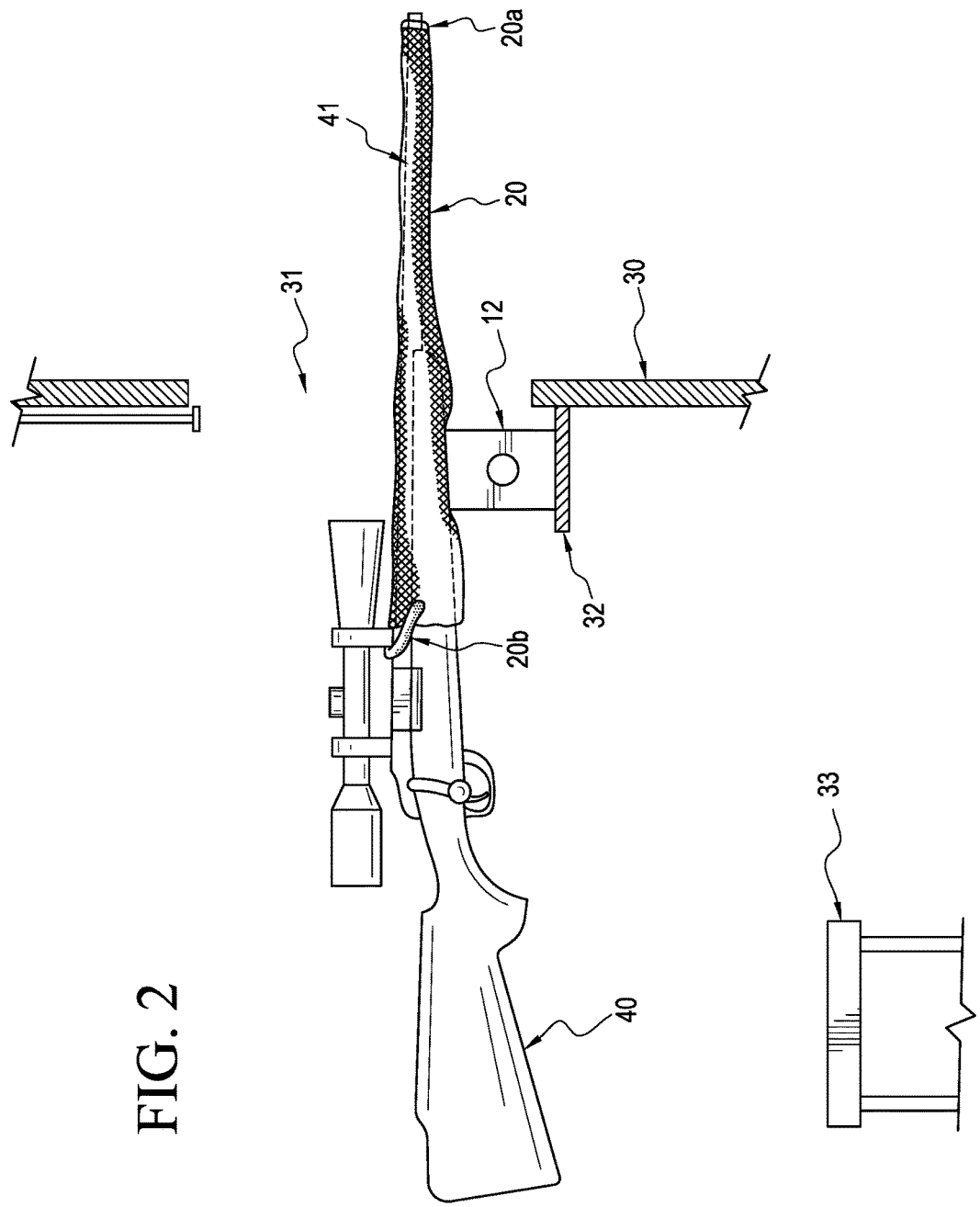
FIG. 2 is a side, cutaway view of the inside of a deer blind, showing the accessories of the invention in use. In particular, this figure shows a rifle positioned on the gun rest component so as to support the rifle to fire from the window of the blind, and the gun sleeve in place on the gun barrel.

Referring to FIG. 2, certain embodiments of the accessories of the invention are shown in use in the environment of a deer blind. A deer blind includes a front wall 30, a window 31, a shelf 32 positioned under the window, and a seat 33. A hunter (not shown, for clarity) is holding rifle 40 for firing, and in such firing position, at least a portion of the gun barrel 41 extends out through the window of the blind.

The gun barrel sleeve preferably covers substantially the entire barrel from the front end of the barrel to about where the gun rests on the gun rest. In a preferred embodiment, the gun sleeve 20 includes an elastic band portion 20a which frictionally secures the front end of the gun barrel sleeve relatively immovably to the front end of the gun barrel, and can frictionally grip the sleeve to different diameter barrels (e.g., rifles of different calibers, shotguns of different gauges or configurations, such as double barrel or over/under). As an alternative to an elastic band, the front of the gun barrel sleeve may be provided with a fastener such as hook and loop (Velcro) which can be tightened around different sizes of gun barrel.

The opposing end (back end) of the gun barrel sleeve is secured further back on the gun, for example at point 20b behind the post which supports the rifle scope. The back end of the gun sleeve may be fasted to the post of the rifle scope by clip, snap, hook and loop (Velcro), tie string, or any other type of fastener. Alternatively, if the rifle or shotgun does not include a scope, the fastening of the rear end of the gun sleeve may be accomplished by securing to a different point on the barrel and/or the stock, for example using a further elastic band.

The gun barrel sleeve is preferably made from a lightweight, weather-resistant material such as cloth or mesh. Alternatively, the gun barrel sleeve may be a neoprene tube. As noted, the gun barrel sleeve is preferably drab color and/or camouflage color.

The gun sleeve can be sized so as to fit over the barrel of most sizes or models of rifle or shotgun. It is not considered critical for the gun sleeve to fit tightly over the gun barrel. Alternatively, the gun barrel sleeve may be sized to fit a particular model, size or caliber of gun.

During use, a hunter carries the gun rest and gun barrel sleeve to a deer blind. The gun barrel sleeve is removed from the gun rest (in those embodiments where the gun barrel sleeve is stored in the gun rest) and fitted over the barrel of the hunter's gun. To position the gun for a shot, the gun rest is placed on the ledge below the blind window, in an orientation to achieve the desired amount of gun elevation, such as three inches, four inches or five inches above the window ledge. The gun is then positioned on the gun rest for firing. As noted, the use of the gun rest as described considerably reduces the risk of accidental noise.

The kit embodiment of the invention may include the gun rest component and the gun barrel sleeve component in a single, common package, optionally with printed instructions for use.

It can be seen from the foregoing description that the gun rest component and the gun sleeve component act together to provide increased stealth, and can therefore increase success, in a hunting environment.

While the invention has been described specifically in reference to use in a deer blind, those skilled in the art will recognize that the invention may be useful in other hunting environments, such as duck blinds, turkey blinds, and the like.

What is claimed is:

1. A combination of accessories for hunting with a scoped rifle, comprising:
    a rest in the form of a solid rectangular block composed of noise dampening material, the block being positionable on a support surface to support the scoped rifle at any of three different shooting heights relative to the support surface, depending on the orientation of the block;
    a barrel sleeve configured to substantially cover the rifle barrel and forestock, the barrel sleeve including a fastener for attaching the back end of the barrel sleeve to a front post which supports a rifle scope on the rifle;
    wherein the solid rectangular block is provided with an opening in the interior thereof which opens to one face of the solid rectangular block, which opening is sized to accommodate the barrel sleeve within the interior of the solid rectangular block for transport and storage.

2. The combination of claim 1, wherein the rectangular block has a length of five inches, a height of four inches and a depth of three inches.

3. The combination of claim 1, wherein the rest is composed of wood, plastic, polymer, rubber or foam.

4. The combination of claim 1, wherein the opening in the rest is lined with a hard plastic cylinder.

5. The combination of claim 1, wherein both the rest and the barrel sleeve are drab colored or camouflage colored.

6. The combination of claim 1, wherein the barrel sleeve is cloth or mesh.

7. The combination of claim 1, wherein the opening in the solid rectangular block is sized to accommodate the barrel sleeve within the interior of the solid rectangular block when the barrel sleeve is rolled up.

8. A combination of accessories for hunting in a hunting blind having a window opening for shooting from the blind and an interior shelf positioned below the window opening, comprising:

a rectangular solid gun rest block composed of noise dampening material adapted to be placed on the interior shelf for positioning a gun for firing out of the blind window opening while the gun is supported on the rectangular solid gun rest block; and a camouflaged or drab colored barrel sleeve adapted to substantially cover a barrel of the gun or the barrel and portion of the gun forestock which extends from the window of the blind during firing;

wherein the rectangular solid gun rest block defines an opening into an interior of the rectangular solid gun rest block that is configured to hold the barrel sleeve within the interior of the block.

9. The combination of claim 8, wherein the rectangular solid gun rest block has a length of five inches, a height of four inches, and a width of three inches.

10. The combination of claim 8, wherein the rectangular solid gun rest block is composed of wood, plastic, polymer, rubber or foam.

11. The combination of claim 8 wherein the barrel sleeve is cloth or mesh.

12. The combination of claim 8, wherein the opening in the rectangular solid gun rest block is sized to accommodate the barrel sleeve within the interior of the block when the barrel sleeve is rolled up.

\* \* \* \* \*